Dec. 12, 1933.   W. J. COULTAS   1,938,954
CORN PICKER
Filed June 6, 1932   2 Sheets-Sheet 2

INVENTOR
Wilbur J. Coultas
BY Brown, Jackson,
Boettcher & Dienner
ATTORNEYS.

WITNESS
Walter Ackerman

Patented Dec. 12, 1933

1,938,954

UNITED STATES PATENT OFFICE 1,938,954

CORN PICKER

Wilbur J. Coultas, Moline, Ill., assignor to Deere & Company, Moline, Ill., a corporation of Illinois Application June 6, 1932. Serial No. 615,541

12 Claims. (Cl. 56—104)

The present invention relates generally to corn harvesters of the type including downwardly and forwardly extending snapping rolls adapted to be driven from any convenient source of power and to be propelled along a row or rows of corn to engage the stalks thereof and to remove the ears of corn therefrom. Generally, harvesters of this type are known as corn pickers.

More specifically, it is the principal purpose of the present invention to provide an implement of this class which is particularly adapted to be used to pick and husk short corn and also for gathering ears of corn that may be lying loosely on the ground. In certain sections of the country a variety of corn is grown the stalks of which do not grow more than a few feet in height and in which the ears of corn grow from the stalk only a short distance above the ground. Sometimes when the corn is ripe the ears hang from the stalks with the tips thereof close to the ground, and sometimes the ears of corn break off of the stalks and fall to the ground. The corn picker of the present invention is, therefore, built especially to gather and harvest corn crops of this character.

More particularly, the present invention contemplates the provision of a corn picker which is built lower to the ground and provided with snapping units arranged and constructed so that the lowest ears of corn on the stalks and even ears lying loosely on the ground are drawn into the snapping rolls. The present invention further contemplates arranging the gatherer points of the picker units so as to float on the surface of the ground and to provide gatherer chains which in the lower positions of the picker units rake or scrape the ground to gather any loose ears of corn lying on the ground in the corn row and to direct the same toward the snapping rolls. In this connection the present invention further contemplates the provision of snapping rolls having a narrow throatway or passage at their lower and forward ends in order to obviate the possibility of any loose ears of corn becoming lodged between or crushed by the lower ends of the snapping rolls.

Figure 1:
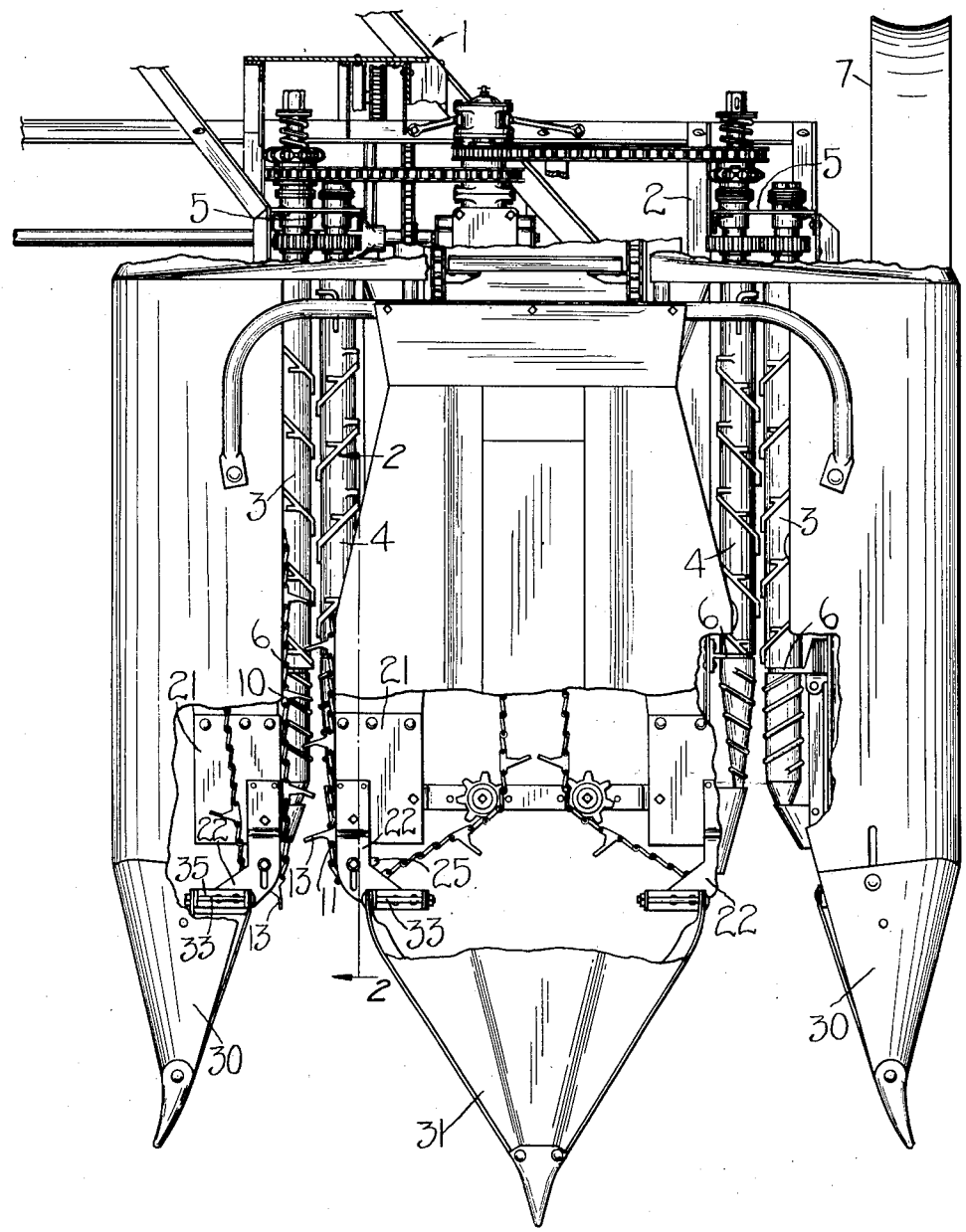
Figure 2:
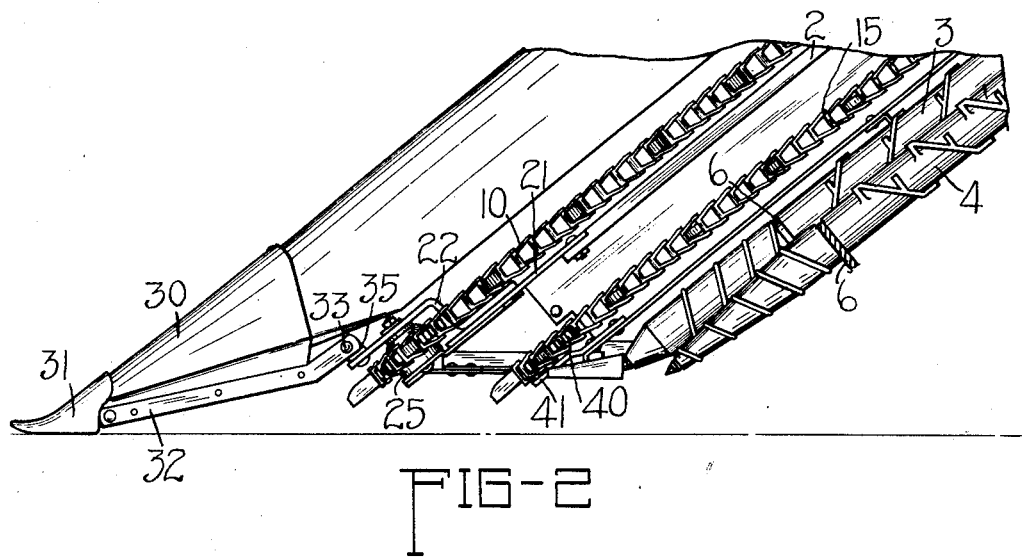
Figure 3:
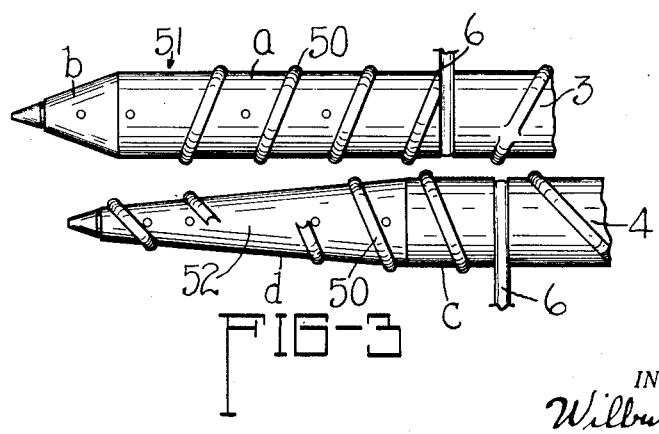

These and other objects of the present invention are best secured by a construction which will now be described and which is illustrated in the accompanying drawings, in which:

Figure 1 is a top plan view of a portion of a corn picker provided with picker units arranged to remove the ears of corn from two rows at the same time;

Figure 2 is a fragmentary view taken along the line 2—2 of Figure 1 and showing the relation between the lower ends of the snapping rolls, the gatherer chains and stalk engaging lugs thereon, and the floating gatherer points pivoted to the picker units; and Figure 3 is an enlarged fragmentary view illustrating the formation of the lower ends of the snapping rolls whereby a long narrow throatway or passage is provided in order to prevent ears of corn from being crushed between the lowermost ends of the snapping rolls.

Referring now to the drawings, the reference numeral 1 in Figure 1 indicates in its entirety the main frame of the machine with which is connected the frame 2 for supporting the snapping rolls, gatherer chains and associated structure. As best shown in Figure 1 the machine shown by way of illustration is provided with two pairs of snapping rolls 3 and 4. These rolls are journaled on the supporting framework 2 by means of brackets 5 carried at the rear of the supporting frame and forward brackets 6 supporting the lower and forward ends of the snapping rolls. The supporting framework 1 and 2 is capable of being tilted about a transverse axis and to be retained in a selected position to raise and lower the front ends of the picker units. Preferably, the axis of tilting is defined by the main axle of the machine and the supporting wheels 7 journaled thereon.

As is usual in this type of machine, a plurality of gatherer chains are arranged adjacent each pair of snapping rolls and is operative to feed or direct the corn stalks toward the rolls so that when the stalks pass between the rolls of each pair of ears of corn are removed. Generally, the gatherer chains are arranged in such a manner that two oppositely disposed chains operate in a plane above the snapping rolls with the stalk engaging lugs of these chains properly staggered so that the lug of one chain comes midway between the lugs of the other chain. In addition, one or more additional gatherer chains may be disposed below the two oppositely arranged chains. In Figure 1 the two oppositely disposed chains for each pair of snapping rolls are indicated by the reference numerals 10 and 11, and each of these chains is provided with stalk engaging lugs or the equivalent indicated by the reference numeral 13. A third gatherer chain 15, see Figure 2, is provided and is mounted underneath the gatherer chain 10 and closely adjacent to the snapping rolls 3 and 4. The chains for each pair of snapping rolls are arranged in the manner just described so that a description of the gatherer chain arrangement for one pair of snapping rolls will suffice.

The gatherer chains are supported upon the frame 2 by suitable sprockets or the like over which the chains are trained and by which they are driven. The sprockets for the upper portions of the gatherer chains are arranged in the conventional manner and for that reason are not illustrated. The present invention, however, contemplates a novel arrangement of the lower sprockets over which the lower portions of the gatherer chains are trained. The lower portions of the frames 2 have plates 21 riveted thereto or secured in any other manner desired, and to these plates are secured brackets 22, see Figure 1, and as best shown in Figure 2 each of these brackets 22 is bent upwardly at its forward end so as to provide a support for the idler sprocket 25 around which the lower portion of the gatherer chain 10 is trained. The other bracket 22 for the same pair of snapping rolls provides a support in a similar manner for the sprocket 25 around which the lower portion of the cooperating gatherer chain 11 is trained, as best shown in Figure 1. The upwardly bent portion of the bracket 22 is formed in this manner so as to support the sprocket 25 below the bracket and at the same time provide a relatively high pivot point for the associated floating gatherer point. Each gatherer point is indicated by the reference numeral 30 and includes a shoe 31 adapted to ride over the surface of the ground and a suitable frame 32 therefor having arms which are pivoted, as at 33, to a small bracket 35 fixed to the front end of the bracket 22. As best shown in Figure 1, the bracket 22 is made sufficiently narrow so as to permit the chain 10 to embrace and pass around the fastened end of the bracket. The other gatherer points are mounted in a similar manner.

The chain 11 is disposed in the same plane as the chain 10 and is associated with its sprocket 25 in the same manner as described above. The intermediate gatherer point, indicated by the reference numeral 31, is supported from the inner brackets 22 in about the same manner as the gatherer points 30 are supported, see Figure 1.

As best shown in Figure 2, the chain 15 is mounted below the chain 10 and closely adjacent the pair of snapping rolls 3 and 4. The lower sprocket for this chain is indicated by the reference numeral 40 and is mounted on the front end of a downwardly and forwardly extending bracket 41 connected with the gatherer supporting framework 2.

As mentioned above, the gatherer frames are adapted to be tilted vertically to raise and lower the front ends of the picking units, and during such adjustment the floating gatherer points will ride on the ground surface. The brackets 22 and 41 are constructed and arranged to bring the sprockets 25 and 40 to a point close to the ground surface so that when the machine is tipped forwardly to the lower positions of adjustment the lugs 13 on the gatherer chains will actually rake or scrape the ground and in doing so will pick up such ears as are lying on the ground between the corn rows. The floating gatherer points 30 and 31, riding on the ground, will function to move loose ears of corn as have rolled away from the corn rows inwardly to where they can be picked up by the gatherer chains.

In order to properly handle such loose ears of corn as are drawn into the machine by the ground engaging gatherer lugs, the lower points of the snapping rolls have been especially formed. The lower ends of the snapping rolls extend farther down than is usual so as to receive loose ears of corn as are picked up by the gatherer chains, and the shape of the lower ends of the snapping rolls have been changed so as to provide a relatively narrow throatway or passage to lessen the tendency of the ears being crushed between the points. Ordinarily, the lower ends of the snapping rolls of corn pickers have rather sharply tapered ends so as to leave a throatway between the tips of the rolls which has an appreciable width at the mouth thereof so as to facilitate the entrance of corn stalks between the snapping rolls. When operating in tall corn the ears of corn, generally speaking, never come into contact with the lower portion of the rolls, but when rolls of this type are used where the corn is exceptionally short and where some of the ears of corn are lying on the ground, it sometimes appears that ears of corn come into contact with the lower ends or tips of the snapping rolls and, due to the wide throatway or passage between the lower ends and also due to the fact that the snapping rolls are rotated in opposite directions tending to draw the stalks down through and between them, such ears of corn are seized by the tips of the rolls and may be crushed thereby.

According to the present invention, the mouth of the throatway or passage has been considerably narrowed, the width thereof being such that even if an ear of corn does come into contact with the lower ends or tips of the snapping rolls, the ear will not be drawn down between the rolls but instead will be merely moved upwardly by the spiral ribs, indicated by the reference numeral 50, on the lower ends of the rolls. The lower end or tip of the snapping roll 3 is indicated by the reference numeral 51 and, from Figure 3, it will be seen that the same comprises a cylindrical portion $a$ having no taper at all and an end portion $b$ having a very steep or short taper. The tip 52 on the snapping roll 4 comprises a short straight portion $c$ of cylindrical formation and a relatively long portion $d$ having a long or very gentle taper. By reason of the provision of the long straight or cylindrical portion $a$ on one snapping roll and terminating in a short or blunt tapered portion $b$, in connection with the provision of a long tapered portion on the other snapping roll which terminates approximately at the intersection of the cylindrical portion $a$ and the short tapered portion $b$ on the other snapping roll, a relatively long narrow throatway or passage is provided. Also, as will be clear from Figure 2, the snapping rolls with their lower ends formed as just described are extended down to a point closely engaging the ground surface so as to just clear the same when the picker is tilted forwardly to bring the lugs of the gatherer chains in position to scrape or rake the ground. By virtue of this construction loose ears of corn lying on the ground which otherwise would be lost are drawn into the machine and saved, and further, the operation of the gatherer chains in picking up loose ears and leaning stalks is greatly facilitated.

While I have described above the structure which the present invention is preferably embodied, it will be apparent that my invention is not to be limited to the specific details shown and described, but that, in fact, widely different means may be employed in the practice of the broader aspects of my invention.

What I claim, therefore, and desire to secure by Letters Patent is:

1. A corn harvester comprising, in combination, a supporting frame, a pair of snapping rolls journaled thereon in closely spaced relation, said snapping rolls being downwardly and forwardly positioned with their forward ends disposed closely adjacent the ground surface, one of said rolls having at its lower end a substantially cylindrical surface terminating downwardly and forwardly in a relatively short tapered point, and bearing means for the lower end of said one roll spaced rearwardly and upwardly from said tapered point and adjacent said cylindrical surface.

2. A corn harvester comprising, in combination, a supporting frame, and a pair of snapping rolls journaled thereon in closely spaced relation, said snapping rolls being downwardly and forwardly positioned with their forward ends disposed closely adjacent the ground surface, one of said rolls having at its lower end a substantially cylindrical surface terminating downwardly and forwardly in a relatively short tapered point, the other roll having at its lower end a tapered point having a long taper disposed in contiguous relation with respect to the cylindrical portion of the first roll and cooperating therewith to form a narrow passage between the lower ends of the snapping rolls.

3. A corn harvester comprising, in combination, a supporting frame, a pair of downwardly and forwardly extending snapping rolls having exposed points extending close to the ground, and gatherer chains operatively associated with said rolls and provided with stalk engaging lugs adapted to contact with the ground surface in advance of the points of said snapping rolls.

4. A corn harvester comprising, in combination, a supporting frame, a pair of downwardly and forwardly extending snapping rolls, cooperating gatherer chains supported by said frame, said chains extending downwardly in spaced relation with respect to said snapping rolls and provided with stalk engaging lugs adapted to engage the ground, and means for supporting the snapping rolls from said supporting frame in position with the lower points thereof exposed and closely adjacent the ground when the lugs on the gatherer chains engage the ground.

5. A corn harvester comprising, in combination, a supporting frame, a pair of downwardly and forwardly extending snapping rolls supported by said frame with their lower ends disposed closely adjacent the ground, and gatherer chains having stalk engaging lugs, said chains being disposed adjacent said rolls and adapted to have the lugs thereof engage the ground to gather ears of corn on the ground, said lower points of said snapping rolls being formed to provide a long narrow throatway dimensioned to prevent ears of corn from becoming lodged therein.

6. A corn harvester comprising, in combination, a supporting frame, downwardly and forwardly extending snapping rolls journaled thereon, a plurality of vertically spaced gatherer chains carried by the supporting frame and arranged to operate in a plane adjacent the plane of the snapping rolls, and lug means secured to said gatherer chains, the upper gatherer chains being extended forwardly farther than the lower gatherer chains and the lug means of said chains being adapted to rake the ground in advance of said snapping rolls, the lower ends of the latter being extended downwardly to a point adjacent the ground to receive the loose ears of corn raked from the ground by said lug means.

7. A corn harvester comprising, in combination, a vertically adjustable supporting frame, a pair of downwardly and forwardly extending snapping rolls, and gatherer chains supported by said frame adjacent the snapping rolls and provided with stalk engaging lugs, said gatherer chains and rolls being so disposed on said frame that when the latter is in a lower position the lugs of said chains rake the ground and the lower ends of said snapping rolls are disposed just above the ground and in position to receive loose ears of corn gathered from the ground by said chains.

8. A corn harvester comprising, in combination, a supporting frame, forwardly diverging gatherer points hingedly connected with the frame and adapted to ride along the ground surface, a pair of snapping rolls supported by said frame in a downwardly and forwardly extending position, bearing means for said rolls spaced from the lower ends thereof, leaving the latter exposed and in plant engaging position, and a plurality of gatherer chains operatively carried by said frame and disposed above the snapping rolls and below the pivotal axis of said gatherer points.

9. A corn harvester comprising, in combination, a supporting frame tiltable in a vertical plane about a transverse axis, a pair of downwardly and forwardly inclined snapping rolls supported by said frame in closely spaced relation, a plurality of gatherer points pivotally connected with said frame for movement about a transverse axis relatively thereto and adapted to contact with the ground at their forward ends, and a plurality of gatherer chains operatively mounted upon said frame and adjacent the snapping rolls, said chains having gatherer lugs adapted to scrape the ground when said frame is disposed in low position, the lower points of said snapping rolls just clearing the ground in said position and adapted to receive the loose ears of corn drawn into the rolls by said lugs.

10. A corn harvester comprising, in combination, a supporting frame, a pair of downwardly and forwardly extending snapping rolls journaled on said frame, bracket means secured near the forward end of said frame, forwardly diverging gatherer points pivotally connected with said bracket means, and gatherer chains for said snapping rolls, said gatherer chains having gatherer lugs thereon adapted to engage the ground between the pivotal axis of said gatherer points and the forward ends of said snapping rolls.

11. A corn harvester comprising, in combination, a supporting frame, downwardly and forwardly extending snapping rolls journaled thereon, bracket means carried at the forward ends of said frame, gatherer points pivotally connected with said brackets for movement about a transverse axis, a pair of vertically spaced gatherer chains operatively mounted on said supporting frame and having gatherer lugs mounted thereon, and sprocket means for the lower ends of said gatherer chains, said sprocket means being spaced longitudinally of the supporting frame whereby the gatherer lugs on both of said gatherer chains are adapted to scrape the ground and to direct loose ears of corn toward said snapping rolls.

12. A corn harvester comprising, in combination, a vertically adjustable supporting frame, a pair of downwardly and forwardly extending snapping rolls journaled on said frame, forwardly diverging gatherer points movably connected with said frame and adapted to engage the ground in various vertically adjusted positions of said frame, the lower ends of said rolls being extended to a point close to the ground, and means carried by said supporting frame and adapted to contact with the ground in the lower positions of said frame at fore and aft spaced points for directing loose ears of corn from between the gatherer points to the lower ends of said snapping rolls.

WILBUR J. COULTAS.